United States Patent
Unger

(10) Patent No.: US 11,981,353 B2
(45) Date of Patent: May 14, 2024

(54) METHOD, DEVICE, COMPUTER PROGRAM, AND COMPUTER PROGRAM PRODUCT FOR CHECKING AN AT LEAST SEMI-AUTONOMOUS DRIVING MODE OF A VEHICLE

(71) Applicant: Bayerische Motoren Werke Aktiengesellschaft, Munich (DE)

(72) Inventor: Christian Unger, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 283 days.

(21) Appl. No.: 17/297,358

(22) PCT Filed: Oct. 21, 2019

(86) PCT No.: PCT/EP2019/078600
§ 371 (c)(1),
(2) Date: May 26, 2021

(87) PCT Pub. No.: WO2020/108863
PCT Pub. Date: Jun. 4, 2020

(65) Prior Publication Data
US 2022/0032964 A1 Feb. 3, 2022

(30) Foreign Application Priority Data
Nov. 30, 2018 (DE) ...................... 10 2018 130 449.8

(51) Int. Cl.
*B60W 60/00* (2020.01)
*B60W 30/095* (2012.01)
*B60W 50/08* (2020.01)

(52) U.S. Cl.
CPC ...... *B60W 60/0053* (2020.02); *B60W 30/095* (2013.01); *B60W 50/08* (2013.01);
(Continued)

(58) Field of Classification Search
CPC ........... B60W 60/0053; B60W 30/095; B60W 50/08; B60W 2556/45; B60W 2720/10;
(Continued)

(56) References Cited

U.S. PATENT DOCUMENTS

| 10,807,591 B1* | 10/2020 | Kentley-Klay | ........ G08B 21/10 |
| 2017/0085415 A1* | 3/2017 | Ameixiera | ............ H04W 48/12 |

(Continued)

FOREIGN PATENT DOCUMENTS

| CN | 101073018 A | 11/2007 |
| CN | 103050018 A | 4/2013 |

(Continued)

OTHER PUBLICATIONS

English translation of Chinese-language Office Action issued in Chinese Application No. 201980077133.X dated Jul. 4, 2022 (eight (8) pages).

(Continued)

*Primary Examiner* — Maceeh Anwari
(74) *Attorney, Agent, or Firm* — Crowell & Moring LLP

(57) ABSTRACT

In a method for checking an at least semi-autonomous driving mode of a vehicle, intervention data are provided by a plurality of vehicles. The intervention data each represent a human intervention in an at least semi-autonomous driving mode of a vehicle. The intervention data includes sensor data at the time of the intervention and position data for a position at the time of the intervention. In accordance with the intervention data from the plurality of vehicles, a position is determined at which an increased number of vehicles registered a human intervention.

8 Claims, 1 Drawing Sheet

(52) U.S. Cl.
CPC ..... *B60W 2556/45* (2020.02); *B60W 2720/10* (2013.01); *B60W 2720/12* (2013.01)

(58) Field of Classification Search
CPC . B60W 2720/12; G08G 1/0129; G08G 1/205; G08G 1/0112
See application file for complete search history.

(56) References Cited

U.S. PATENT DOCUMENTS

| | | | |
|---|---|---|---|
| 2019/0051159 A1* | 2/2019 | Wang | G05D 1/0088 |
| 2019/0066410 A1* | 2/2019 | Buchholz | G08G 1/0112 |
| 2019/0135283 A1* | 5/2019 | Bonk | G01C 21/3453 |
| 2019/0212746 A1* | 7/2019 | Cheng | G01K 3/14 |
| 2019/0220011 A1* | 7/2019 | Della Penna | G05D 1/0212 |
| 2019/0286151 A1* | 9/2019 | Palanisamy | G08G 1/096816 |
| 2020/0005645 A1* | 1/2020 | Wray | B60W 30/18159 |
| 2020/0033869 A1* | 1/2020 | Palanisamy | B60W 40/10 |

FOREIGN PATENT DOCUMENTS

| | | |
|---|---|---|
| CN | 107767487 A | 3/2018 |
| DE | 10 2011 084 633 A1 | 4/2013 |
| DE | 10 2016 001 955 A1 | 8/2017 |
| DE | 10 2017 201 612 A1 | 8/2018 |

OTHER PUBLICATIONS

International Search Report (PCT/ISA/210) issued in PCT Application No. PCT/EP2019/078600 dated Dec. 19, 2019 with English translation (six (6) pages).

German-language Written Opinion (PCT/ISA/237) issued in PCT Application No. PCT/EP2019/078600 dated Dec. 19, 2019 (six (6) pages).

German-language Search Report issued in German Application No. 10 2018 130 449.8 dated Nov. 13, 2019 with partial English translation (12 pages).

* cited by examiner

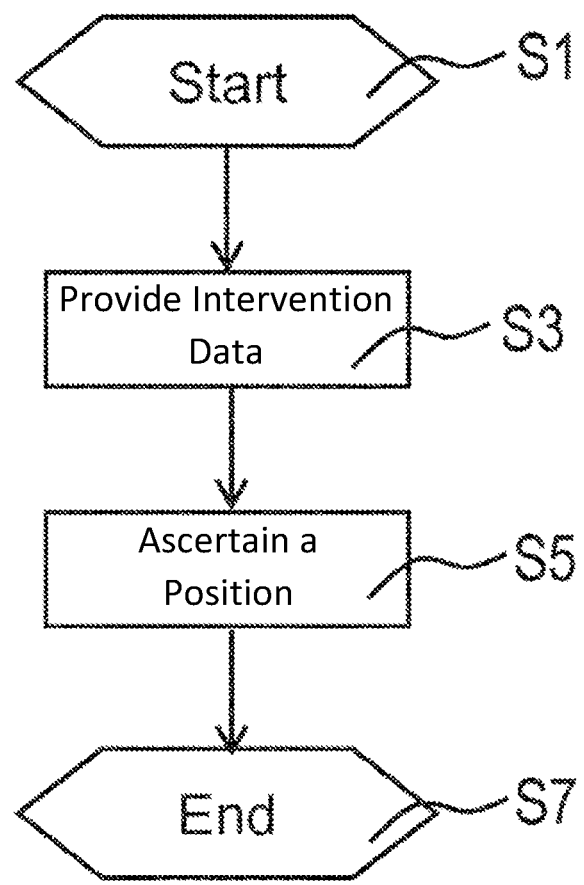

METHOD, DEVICE, COMPUTER PROGRAM, AND COMPUTER PROGRAM PRODUCT FOR CHECKING AN AT LEAST SEMI-AUTONOMOUS DRIVING MODE OF A VEHICLE

BACKGROUND AND SUMMARY OF THE INVENTION

The invention relates to a method for checking an at least semiautonomous driving mode of a vehicle. The invention furthermore relates to a device for checking an at least semiautonomous driving mode of a vehicle. The invention furthermore relates to a computer program and a computer program product for checking an at least semiautonomous driving mode of a vehicle.

Many modern vehicles include at least one semiautonomous driving mode, for example a lane keeping assistant, i.e., an assistant for autonomous lateral control and/or an assistant for autonomous longitudinal control.

The object underlying the invention is to contribute to an at least semiautonomous driving mode being able to be carried out reliably.

The object is achieved by the features of the independent claims. Advantageous embodiments are characterized in the dependent claims.

According to a first aspect, the invention is distinguished by a method for checking an at least semiautonomous driving mode of a vehicle. The invention is furthermore distinguished by a device, wherein the device is designed to carry out the method for checking an at least semiautonomous driving mode of a vehicle.

In the method, intervention data are provided by a plurality of vehicles, wherein the intervention data are each representative for a human intervention in an at least semi-autonomous driving mode of a vehicle. The intervention data comprise sensor data at the time of the intervention and position data for a position at the time of the intervention. A position, at which an increased number of vehicles has registered a human intervention, is ascertained in dependence on the intervention data of the plurality of vehicles.

In an at least semiautonomous driving mode of a vehicle, it can occur that the semiautonomous driving mode is carried out incorrectly again and again at the same point, since, for example, sensor data are incorrect at this point, so that without human intervention, for example, the vehicle would deviate from the road. In that it is now ascertained in a plurality of vehicles, for example a vehicle fleet, at which position human interventions took place, it can be ascertained easily at which positions an at least semiautonomous driving mode was presumably carried out incorrectly.

The position ascertained in this way can then be used further in greatly varying ways to improve the driving mode at this position. For example, correction parameters for the ascertained position can be ascertained or this position can be approached deliberately using development vehicles to acquire more detailed sensor data. Furthermore, it can thus be identified at which points an approval is possible for highly automated/fully automated systems and at which points an approval is not to take place, since an intervention probability is very high.

The sensor data comprise, for example, a specified time period before and after the intervention, for example a time period of 15 seconds in the past and 15 seconds in the future from the time of the intervention. The sensor data do not comprise raw data, for example, but solely detected objects of the sensor system, so that an amount of data to be transmitted is small.

The intervention can be recognized, for example, in that an autonomous driving mode is interrupted by grasping the steering wheel and/or by actuating a pedal and/or in that a passive driving strategy is ascertained in the background, which is representative for operation without human intervention and gross deviations between the passive driving strategy are assessed as an intervention.

The position at which an increased number of vehicles has registered a human intervention can be ascertained, for example, in that local maxima of positions which deviate in a statistically significant manner are ascertained from the set of all interventions.

According to an optional embodiment, it is ascertained in dependence on the intervention data of an individual vehicle of the plurality of vehicles which type the human intervention was.

The interventions may be additionally classified in this way, so that they can be analyzed according to class in different ways. Exemplary classes are braking to a standstill, counter steering to the right/left, tracking to the right/left, no relevant intervention, since the driver wishes to drive further himself.

According to a further optional embodiment, it is ascertained in dependence on the intervention data of the individual vehicle and the ascertained type of the human intervention whether the intervention took place due to an error of the at least semiautonomous driving mode.

It can furthermore be ascertained by the intervention data whether possibly no error at all exists, since a driver himself wishes to drive further (not autonomously). For this purpose, for example, a check is carried out of the chronological coherence of the sensor data per individual case. For example, in lane detection, it frequently occurs that curve radii are incorrectly estimated. However, the measured lateral offset of the lane recognition at a specific point at close range is usually quite stable. The lane course can be completely reconstructed in retrospect on the basis of the intervention data via the chronological tracking of the measured lateral offset of the lane. In this specific case, it can thus be established whether the driver has carried out an intentional lane change, or whether the curve radius is always incorrectly estimated on a one lane road/exit.

According to a further optional embodiment, correction parameters are ascertained in dependence on the intervention data of the plurality of vehicles and transmitted to the plurality of vehicles, wherein the correction parameters are representative of corrected sensor data, by means of which an at least semiautonomous driving mode without human intervention is enabled at the ascertained position.

Values for the sensors may thus possibly be ascertained from the intervention data, by means of which a human intervention would not have had to take place. These data corrected in this way can thus be used so that during a future drive, the at least semiautonomous driving mode can be carried out successfully at the ascertained position.

According to a further optional embodiment, the semiautonomous driving mode comprises an autonomous lateral control and/or an autonomous longitudinal control of the vehicle.

In particular in the case of the autonomous lateral control, it can be ascertained very easily by means of the above-described method whether the lateral control was successful or incorrect, so that in particular a lane keeping assistant can be improved. Furthermore, however, the method can also be applied for the longitudinal control, for example, in the case of a traffic signal recognition: Weaknesses in the traffic signal recognition can be indicated via "unexplainable" braking actions to a standstill. For example, it can be ascertained by means of the intervention data that braking actions to a standstill have taken place although no vehicle in front was detected and no red traffic signal was recognized. For example, it can moreover be ascertained by means of the intervention data that possibly existing stop signs/yield signs are usually not observed (or only at certain times of day).

According to a further optional embodiment, a data collection message is transmitted to the plurality of vehicles in dependence on the ascertained position, which is representative of the fact that the plurality of vehicles are to acquire and transmit specified sensor data when driving on the ascertained position.

In particular if it is not possible from the intervention data provided up to this point to ascertain correction parameters, the entire vehicle fleet can be used to analyze the ascertained position more accurately. Alternatively or additionally, the position can also deliberately be approached using development vehicles in order to acquire highly accurate sensor data and thus in future to enable an error-free autonomous driving mode at this position.

According to a further optional embodiment, a stop message is transmitted to at least a subset of the plurality of vehicles in dependence on the ascertained position, which is representative of the fact that the subset of the plurality of vehicles are no longer to transmit intervention data when driving on the ascertained position.

It can also be that an incorrect autonomous driving mode always takes place for a subset of the plurality of vehicles at the position, for example because the sensors installed in these vehicles are too old and/or too inaccurate. In such cases, it can be reasonable to stop the transmission of the intervention data of these vehicles in order to avoid an unnecessary data transmission and amount of data.

According to a further aspect, the invention is distinguished by a computer program, wherein the computer program is designed to carry out the method of the first aspect.

According to a further aspect, the invention is distinguished by a computer program product which comprises an executable program code, wherein the program code executes the method of the first aspect upon execution by a data processing device.

The computer program product comprises in particular a medium readable by the data processing device, on which the program code is stored.

Exemplary embodiments of the invention are explained in greater detail in the following on the basis of the schematic drawing.

BRIEF DESCRIPTION OF THE DRAWING

FIG. 1 is a flow chart for checking an at least semiautonomous driving mode.

DETAILED DESCRIPTION OF THE DRAWING

FIG. 1 shows a flow chart for checking an at least semiautonomous driving mode of a vehicle.

The program can be run by a device. The device is formed, for example, in a server and/or a backend. The device can also be formed distributed in a cloud.

The device can also be referred to as a device for checking an at least semiautonomous driving mode.

The device includes, for this purpose, in particular a processing unit, a program and data memory, and also, for example, one or more communication interfaces. The program and data memory and/or the processing unit and/or the communication interfaces can be formed in one structural unit and/or distributed onto multiple structural units.

For this purpose, in particular a program for checking an at least semiautonomous driving mode is stored on the program and data memory of the device.

The program is started in a step S1, in which variables can be initialized if necessary.

In a step S3, intervention data are provided by a plurality of vehicles, wherein the intervention data are each representative for a human intervention in an at least semiautonomous driving mode of a vehicle and wherein the intervention data comprise sensor data at the time of the intervention and position data for a position at the time of the intervention.

The plurality of vehicles is, for example, a vehicle fleet of a vehicle producer or at least a part of a vehicle fleet of a vehicle producer.

To reduce the amount of transmitted data, the sensor data do not comprise, for example, raw data, but only detected objects of the sensors, such as traffic signals, road markings, and/or other objects such as obstacles, other vehicles, and the like.

The position data can be ascertained, for example, by means of a global navigation satellite system such as GPS in the respective vehicle.

The intervention data are transmitted, for example, after each intervention, via a wireless communication interface of the respective vehicle to a database and subsequently provided by the database.

In a step S5, a position, at which an increased number of vehicles has registered a human intervention, is ascertained in dependence on the intervention data of the plurality of vehicles.

The position at which an elevated number of vehicles has registered a human intervention can be ascertained, for example, in that local maxima of positions are ascertained from the set of all interventions, in particular local maxima which deviate in a statistically significant manner.

Subsequently, the program is ended in a step S7 and can be started again if necessary in step S1.

For classification of the interventions, it can additionally be ascertained in dependence on the intervention data of an individual vehicle of the plurality of vehicles which type the human intervention was. The type can comprise, for example: braking to a standstill, counter steering to the right/left, tracking to the right/left, no relevant intervention, since the driver wishes to drive further himself.

Furthermore, the intervention data can be used to ascertain whether the intervention took place due to an error of the autonomous driving mode.

The above-provided intervention data and the ascertained position at which an elevated number of vehicles has registered a human intervention can subsequently be used to determine further measures.

For example, correction parameters can be ascertained in dependence on the intervention data of the plurality of vehicles and transmitted to the plurality of vehicles, wherein the correction parameters are representative for corrected sensor data, by means of which an at least semiautonomous driving mode without human intervention is enabled at the ascertained position.

If it is not (yet) possible to ascertain correction parameters on the basis of the existing data, alternatively or additionally, a data collection message can be transmitted to the plurality of vehicles in dependence on the ascertained position, which is representative of the fact that the plurality of vehicles is to acquire and transmit specified sensor data when driving on the ascertained position. The ascertained position can be studied more accurately in this way and correction parameters can subsequently be ascertained if necessary in dependence on the new sensor data. In addition, the position can also deliberately be approached using development vehicles in order to acquire more detailed sensor data and if necessary correction parameters are subsequently ascertained in dependence on the more detailed sensor data.

Furthermore, in dependence on the ascertained position, a map can be prepared which is representative of positions at which an approval for highly/fully automated systems is possible, since an intervention probability is very low and for positions at which an approval for highly/fully automated systems is not reasonable, since an intervention probability is very low.

In summary, a very large number of vehicles can thus contribute by way of the above method to each individual vehicle being able to operate more reliably in an at least semiautonomous driving mode.

What is claimed is:

1. A method for checking an at least semiautonomous driving mode of a vehicle, the method comprising:
   receiving, from a first plurality of vehicles, intervention data, wherein the intervention data are each representative of a human intervention in an at least semiautonomous driving mode of a vehicle, and wherein the intervention data comprise sensor data at the time of the intervention and position data for a position at the time of the intervention;
   ascertaining a position at which an elevated number of vehicles has registered a human intervention in dependence on the intervention data of the first plurality of vehicles;
   in response to ascertaining the position at which the elevated number of vehicles has registered a human intervention, transmitting a data collection message to a second plurality of vehicles to acquire and transmit specified sensor data when driving at the ascertained position, wherein the data collection message causes the second plurality of vehicles to acquire and transmit the specified sensor data when driving at the ascertained position, wherein the second plurality of vehicles is larger than the first plurality of vehicles; and
   causing one or more development vehicles to approach the ascertained position and acquire more detailed sensor data of the ascertained position.

2. The method according to claim 1, wherein
   depending on the intervention data of an individual vehicle of the first plurality of vehicles, ascertaining which type of the human intervention occurred.

3. The method according to claim 2, wherein
   depending on the intervention data of the individual vehicle and the ascertained type of the human intervention, ascertaining whether the intervention took place due to an error of the at least semiautonomous driving mode.

4. The method according to claim 1, wherein
   correction parameters are ascertained in dependence on the intervention data of the first plurality of vehicles and transmitted to at least the first plurality of vehicles, and
   the correction parameters are representative for corrected sensor data, by which an at least semiautonomous driving mode without human intervention is enabled at the ascertained position.

5. The method according to claim 1, wherein
   the semiautonomous driving mode comprises an autonomous lateral control and/or an autonomous longitudinal control of the vehicle.

6. The method according to claim 1, wherein
   a stop message is transmitted to at least a third plurality of vehicles in dependence on the ascertained position, which stop message is representative of the fact that the third plurality of vehicles is no longer to transmit intervention data when driving on the ascertained position.

7. A device for checking an at least semiautonomous driving mode of a vehicle, comprising:
   one or more processors and associated memory operatively configured to:
   receive, from a first plurality of vehicles, intervention data, wherein the intervention data are each representative of a human intervention in an at least semiautonomous driving mode of a vehicle, and wherein the intervention data comprise sensor data at the time of the intervention and position data for a position at the time of the intervention;
   ascertain a position at which an elevated number of vehicles has registered a human intervention in dependence on the intervention data of the first plurality of vehicles;
   determine whether correction parameters can be ascertained in dependence on the intervention data of the first plurality of vehicles, wherein the correction parameters are representative for corrected sensor data, by which an at least semiautonomous driving mode without human intervention is enabled at the ascertained position; and
   in response to determining that the correction parameters cannot be ascertained in dependents on the intervention data of the first plurality of vehicles, transmit a data collection message to a second plurality of vehicles to acquire and transmit specified sensor data when driving at the ascertained position, wherein the data collection message causes the second plurality of vehicles to acquire and transmit the specified sensor data when driving at the ascertained position, wherein the second plurality of vehicles is larger than the first plurality of vehicles.

8. A computer program product for checking an at least semiautonomous driving mode of a vehicle, comprising a non-transitory computer readable medium having stored thereon executable program code, wherein the program code upon execution by a data processing device, carries out the acts of:
   receiving, from a first plurality of vehicles, intervention data, wherein the intervention data are each representative of a human intervention in an at least semiautonomous driving mode of a vehicle, and wherein the intervention data comprise sensor data at the time of the intervention and position data for a position at the time of the intervention; and
   ascertaining a position at which an elevated number of vehicles has registered a human intervention in dependence on the intervention data of the first plurality of vehicles;
   in response to ascertaining the position at which the elevated number of vehicles has registered a human intervention, transmit a data collection message to a second plurality of vehicles to acquire and transmit specified sensor data when driving at the ascertained position, wherein the data collection message causes the second plurality of vehicles to acquire and transmit the specified sensor data when driving at the ascertained position, wherein the second plurality of vehicles is larger than the first plurality of vehicles; and determining whether a fully automated mode of the at least semiautonomous driving mode of at least one other vehicle can be enabled at the ascertained position based on the intervention data from the first plurality of vehicles and/or the sensor data from the second plurality of vehicles; and in response to determining that the fully automated mode cannot be enabled at the ascertained position, causing the fully automated mode to be disabled at the ascertained position in the at least one other vehicle.

* * * * *